United States Patent [19]

Bagwell et al.

[11] 4,086,934
[45] May 2, 1978

[54] PIPELINE WELD REPAIR CAP

[75] Inventors: Marshall Underwood Bagwell; Arnold Eugene Barrett, both of Atlanta, Ga.

[73] Assignee: Colonial Pipeline Company, Atlanta, Ga.

[21] Appl. No.: 722,720

[22] Filed: Sep. 13, 1976

[51] Int. Cl. ................................................ F16k 43/00
[52] U.S. Cl. ..................................... 137/322; 137/315; 138/97; 138/99; 228/119; 251/323; 285/15
[58] Field of Search ............... 137/315, 317, 316, 319, 137/322; 138/97, 99; 285/15, 17, 21; 228/119; 251/321, 322, 323

[56] References Cited

U.S. PATENT DOCUMENTS

| 1,737,181 | 11/1929 | Woodword | 137/315 |
|---|---|---|---|
| 2,046,766 | 7/1936 | Bronsell | 138/99 |
| 2,236,913 | 4/1941 | Merrill | 138/99 |
| 2,520,802 | 8/1950 | Hampton | 138/99 |
| 2,655,946 | 10/1953 | Morris | 138/99 |
| 3,043,342 | 7/1962 | Graham | 138/99 |
| 3,053,282 | 9/1962 | Fox | 138/99 |
| 3,150,690 | 9/1964 | Danielson et al. | 138/99 |
| 3,353,724 | 11/1967 | Johnston | 137/322 |
| 3,387,621 | 6/1968 | Schaff | 137/322 |
| 3,746,370 | 7/1973 | Aulisa | 285/15 |

Primary Examiner—Alan Cohan
Assistant Examiner—G. L. Walton
Attorney, Agent, or Firm—Newton, Hopkins & Ormsby

[57] ABSTRACT

A pipeline repair device is held in place against a pipeline while it is being welded. The device features an elongated body having a bottom surface provided with a recess to present a footprint surface which circumscribes the pipeline defect. The recess provides a stepped portion around the inner periphery of the footprint surface and a resilient gasket is received in this stepped portion. The thickness of the gasket is such as causes it to protrude below the footprint surface to provide a pressure tight seal between the repair device and the pipeline.

12 Claims, 5 Drawing Figures

PIPELINE WELD REPAIR CAP

BACKGROUND OF THE INVENTION

There are a great many miles of buried pipeline in the United States, some of which is bare pipe and others of which have various coatings to protect them against corrosion. It is well known that a common source of leakage in both covered and uncovered pipelines is due to galvanic action which causes the formation of corrosion defects which may become larger and larger as time progresses.

Buried pipelines are subject to damage which, when detected, must be corrected. There have been various proposals for repairing defects in underground pipelines such as providing split sleeve type of repair devices which are clamped in place as, for example, in U.S. Pat. Nos. 1,911,126; 2,002,577; 2,046,766 and 2,999,515.

Welded patches have been proposed as for example in U.S. Pat. Nos. 2,236,913; 2,655,946; 3,043,342; 3,053,282; 3,586,057; 3,737,180; 3,746,370.

However, in all of these prior art devices, the repair device must be shaped to fit the particular diameter of pipe involved and with the welded type of repair devices, an inordinate degree of welding is ordinarily necessitated by the nature of the repair device utilized.

BRIEF SUMMARY OF THE INVENTION

It is therefore of primary concern in connection with this invention to provide an improved and simplified welded type of device for pipeline repair in which a standard device will fit steel pipelines of various diameters and wherein the device may be made so as to be relatively small in size, thereby minimizing the welding.

Basically, the present invention utilizes a body of material having a bottom surface provided with a recess which presents a circumscribing footprint area or surface which is adapted to be clamped onto a pipe in circumscribing relationship to the defect. The recess presents a stepped portion around the inner periphery of the footprint surface which contains a resilient gasket. The resilient gasket is of a thickness to protrude below the footprint surface by an amount to make a pressure tight seal around the defect while the device is held in place while being welded.

BRIEF DESCRIPTION OF THE DRAWING FIGURES

DETAILED DESCRIPTION OF THE INVENTION

Figure 1:
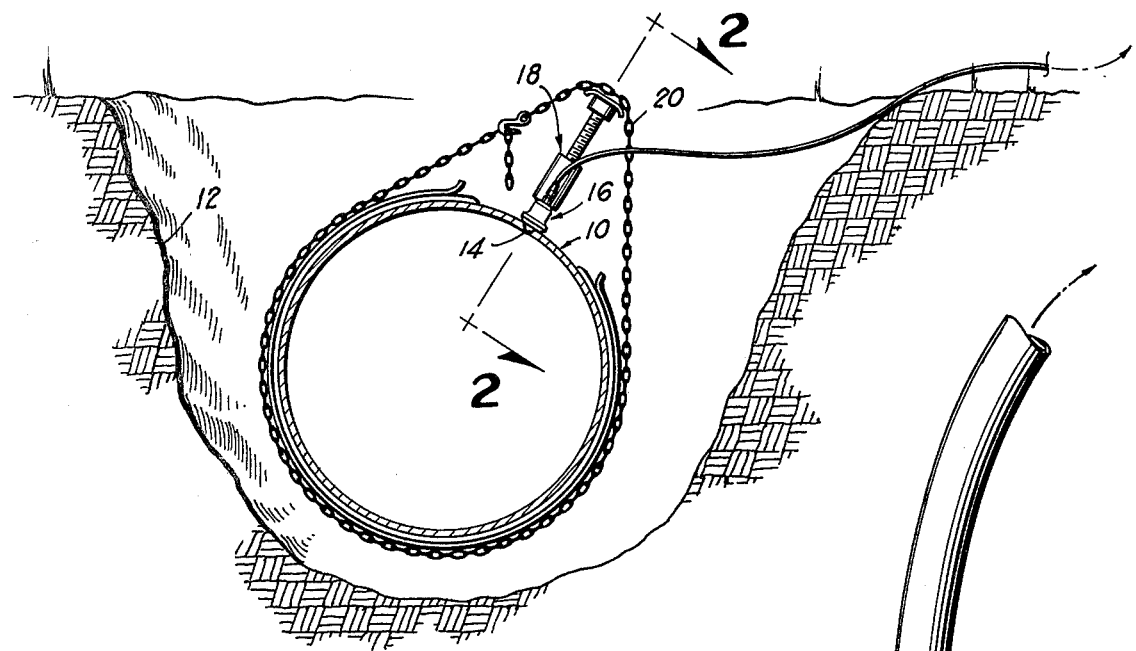
FIG. 1 is a vertical section taken through an exposed portion of a buried pipeline and illustrating the invention as applied to a pipeline and prior to welding.

FIG. 1 illustrates an exposed section 10 of a buried pipeline, the trench 12 having been excavated to expose the section of the pipeline which has the defect 14 therein. The repair device according to this invention is indicated generally by the reference character 16 and will be seen to be held in place by means of the screw jack 18 reacting between the device 16 and a chain or similar endless member 20 disposed around the pipeline 10.

Figure 2:
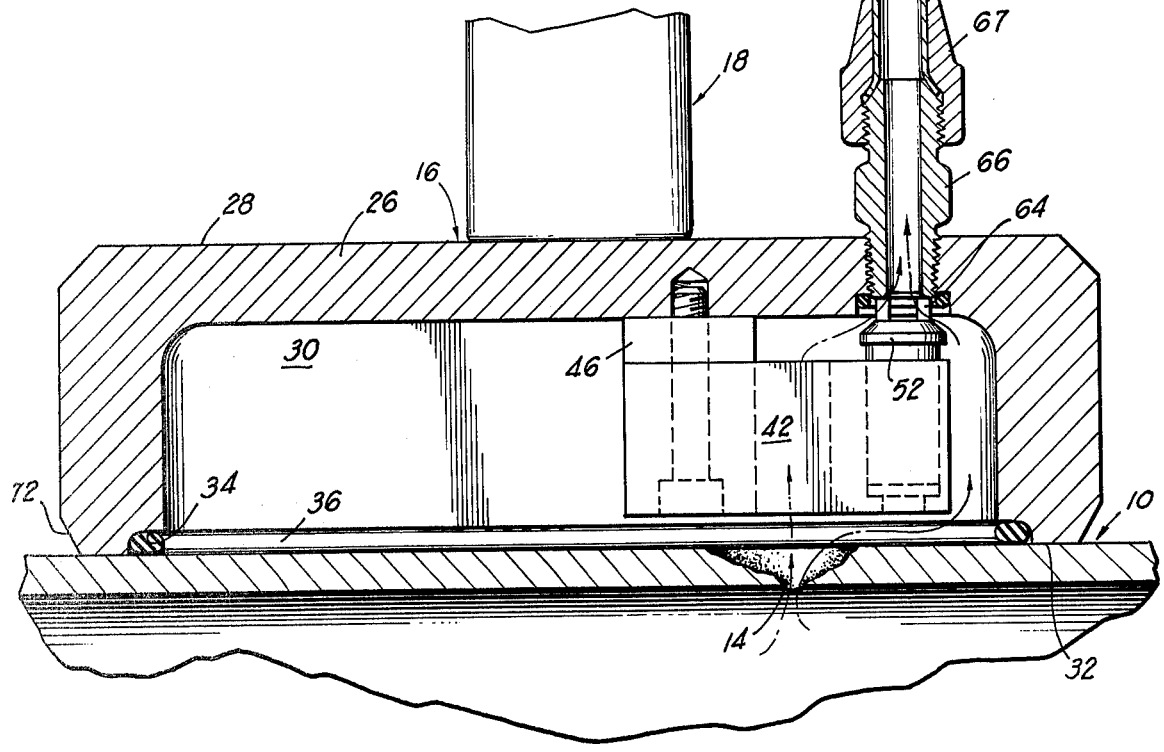
FIG. 2 is an enlarged vertical section taken substantially along the plane of Section line 2—2 in FIG. 1.
Figure 5:
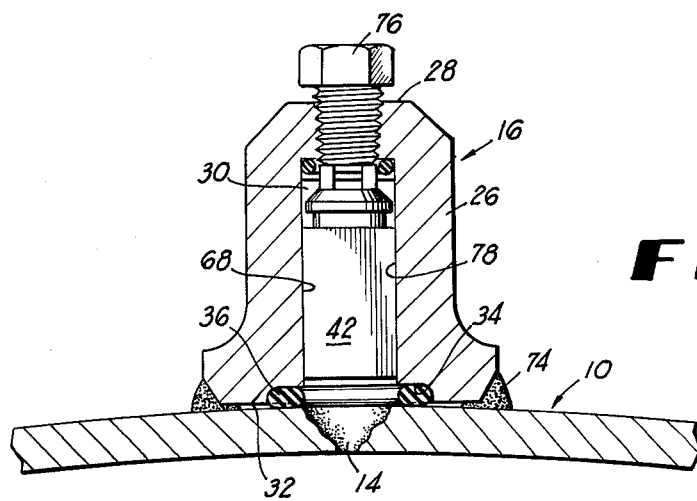
FIG. 5 is a vertical section taken substantially along the plane of Section line 5—5 in FIG. 4.

Referring simultaneously to FIGS. 2 and 5, the device 16 will be seen to comprise a body 26 made of steel or the like and which is substantially longer than it is wide, as will be evident from the two Figures. The body 26 is provided with a flat top surface 28 so as to provide a good surface against which the jack 18 may react and it is also provided with a bottom surface parallel to the top surface 28 and which bottom surface is provided with a recess 30 whereby the bottom surface of the body defines a footprint surface 32, see particularly FIG. 5, which surrounds the defect 14. The recess also provides the stepped portion 34 which extends around the inner periphery of the footprint surface 32 and which is of a prescribed, uniform depth. A resilient gasket 36 fits within the stepped portion 34 and initially is of a thickness so as to protrude well below the footprint surface 32. The purpose of this construction is to allow the gasket 36 to seal between the device 26 and the pipeline 10, as will be clearly evident from FIG. 5.

Figure 3:
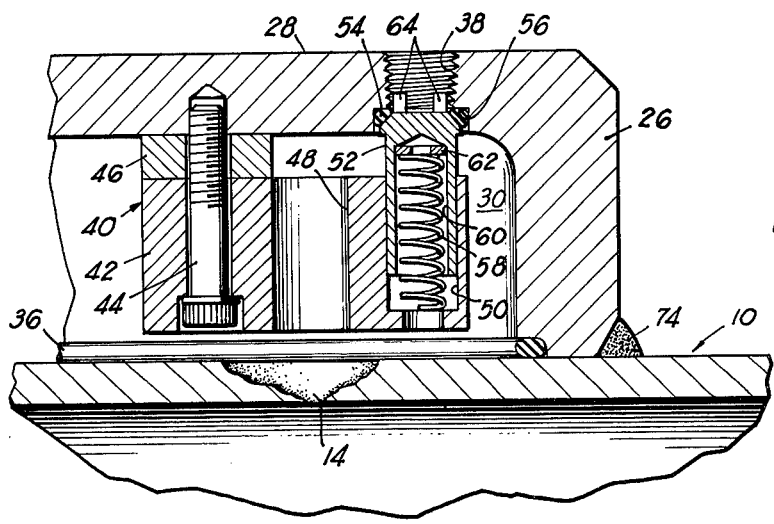
FIG. 3 is a view similar to FIG. 2 but illustrating the valve means in section.

The top wall of the body is provided with a threaded vent opening 38 as will be seen most clearly in FIG. 3 and valve means indicated generally by the reference character 40 is disposed within the recess 30. The valve means 40 includes a valve block 42 which is connected, by means of a bolt 44 to the top wall of the body 26, the spacer 46 being disposed between the block 42 and the body 26, as shown. The block 42 may be provided with one or more fluid flow passages 48 and is additionally provided with a bore 50 within which the valve member 52 is slidably fitted, the valve member 52 being disposed in alignment with the vent opening 38. The upper end of the valve member 52 is closed and its periphery is beveled as shown to engage against a gasket 54 fitted within the stepped portion 56 of the vent opening 38. The spring 58 seats within the bore 50 and projects within the bore 60 in the valve member 52 and seats upon a washer 62 normally to force the valve member 52 upwardly and into sealing engagement within the gasket 54 as is shown in FIG. 3. The top of the valve member is provided with one or more projections 64 whose purpose will be presently apparent.

Figure 4:
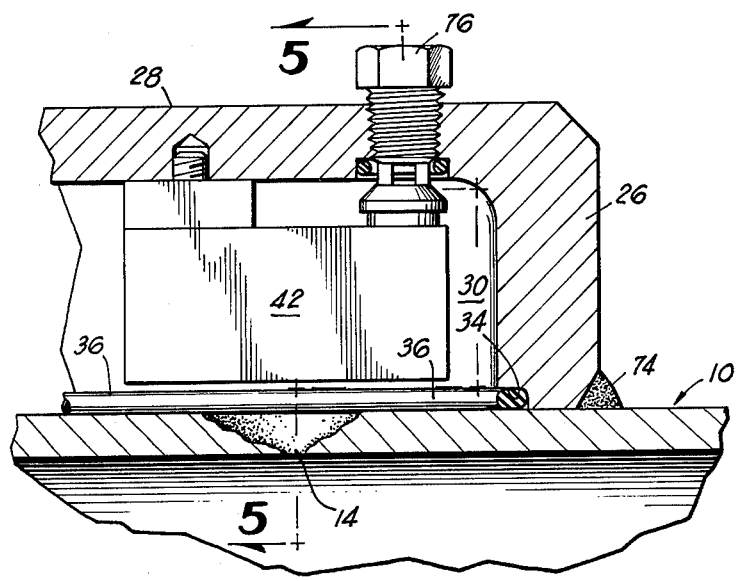
FIG. 4 is a view similar to FIG. 3 but showing the device after the vent opening has been plugged off.

When the device is in position as shown in FIG. 1 and prior to welding, the connector 66 is threaded into the vent opening 38 and to engage the projections 64 thereby unseating the valve member 52, the connector 66 being connected by suitable nut 67 to a conduit 70. The conduit means allows any fluid which may be escaping through the defect 14 to be conveyed away from the site at which the welding is taking place. FIG. 2 also illustrates the fact that the outer periphery of the footprint surface is beveled as at 72 to facilitate the welding and when the parts are positioned as in FIG. 1, the welding may be effected as indicated at 74 in FIGS. 3, 4 and 5. When the device has been welded up, the jack 18 and the chain 20 are removed whereafter the connector 66 is also removed which allows the valve member automatically to seal off the vent opening 38 as is illustrated in FIG. 3. To complete the assembly, a plug 76 may be screwed into the vent openings 38 to effect a permanent seal of this vent opening.

Preferably, the body 26 is made of mild steel or other material similar to that of the pipeline. The recess 30 preferably is so formed as to present parallel inner wall surfaces 68 and 78 as shown in FIG. 5 which snugly receive the valve block 42 therebetween and automatically position its bore in correct lateral alignment with the sealing gasket 54 of the vent opening 38.

What is claimed is:

1. Apparatus for repairing a defect in a pipeline without interrupting service through the pipeline comprising in combination:

a repair body having an elongate, narrow and substantially flat bottom surface provided with a recess to define a footprint surface which surrounds the defect in the pipeline, said recess being stepped around the inner periphery of said footprint surface, said body having circumscribing and inwardly bevelled side walls intersecting said footprint surface and defining an outer periphery of said footprint surface closely adjacent said recess and in at least close proximity to the pipeline to permit such outer periphery to be joined to the pipeline by welding, and a resilient gasket disposed within the stepped portion of the recess;

means for clamping said body temporarily against the pipeline so that said gasket sealingly engages between said body and the pipeline in circumscribing relation around the defect;

said body having a vent opening leading to said recess and valve means within said recess and aligned with said vent opening normally to prevent communication between said recess and ambient atmosphere through said vent opening, said valve means comprising a valve block secured within said recess, a valve member slidable in said block and aligned with said vent opening, and spring means normally urging said valve member toward said vent opening; and conduit means removably received in said vent opening for temporarily opening said valve means while said body is being welded to the pipeline.

2. Apparatus as defined in claim 1 including a plug which, after the conduit means is removed, is installed in the vent opening to make a permanent seal and prevent leakage.

3. Apparatus for repairing a defect in a pipeline without interrupting service through the pipeline, comprising in combination:

a repair body having a bottom surface provided with a recess to define a footprint surface which surrounds the defect in the pipeline, said recess being stepped around the inner periphery of said footprint surface, and a resilient gasket disposed within the stepped portion of the recess;

means for clamping said body temporarily against the pipeline so that said gasket sealingly engages between said body and the pipeline in circumscribing relation around the defect;

said body having a vent opening leading to said recess and valve means within said recess and aligned with said vent opening normally to prevent communicaton between said recess and ambient atmosphere through said vent opening; and conduit means removably received in said vent opening for temporarily opening said valve means while said body is being welded to the pipeline;

said footprint surface being flat and said body being beveled around the outer periphery of said footprint surface to facilitate welding;

said valve means comprising a valve block secured to said body within said recess, a valve member slidable in said block and aligned with said vent opening, and spring means engaging between said valve block and said valve member normally urging said valve member toward said vent opening.

4. Apparatus as defined in claim 3 wherein said body is provided with a flat upper surface parallel to said footprint surface.

5. Apparatus as defined in claim 4 wherein said clamp means includes a jack seated upon said flat upper surface of the repair body.

6. Apparatus as defined in claim 5 wherein said valve block is snugly received between the walls of said recess to position said valve member in alignment with said vent opening.

7. Apparatus as defined in claim 5 and a chain encircling the pipeline against which the jack can react.

8. A device for repairing defects in a pipeline, comprising in combination:

an elongate repair body having a bottom surface, said bottom surface of the body being recessed to define a narrow, substantially flat footprint surface of elongate, closed path form having a stepped portion extending around the inner periphery of such footprint surface, said body having circumscribing and inwardly bevelled side walls, intersecting said substantially flat footprint surface and defining an inwardly displaced outer periphery of said footprint surface closely adjacent said recess and adapted to lie in at least close proximity to a pipeline to permit such outer perphery to be joined to the pipeline by welding;

a gasket shaped to be received in said stepped portion and having a thickness to protrude below said footprint surface whereby to accommodate for disparity between the flatness of said footprint surface and the roundness of a pipeline; and said body having a vent opening leading to said recess and valve means within said recess and aligned with said vent opening normally to prevent communication between said recess and ambient atmosphere through said vent opening, said valve means comprising a valve block secured within said recess, a valve member slidable in said block and aligned with said vent opening, and spring means normally urging said valve member toward said vent opening.

9. A device as defined in claim 8 including valve means secured to said body within said recess, said body having a vent opening therein aligned with said valve means, and conduit means removably received in said vent opening to open said valve means and conduct away any escaping pipeline product.

10. A device for repairing defects in a pipeline, comprising in combination:

an elongate repair body having a bottom surface, said bottom surface of the body being recessed to define a footprint surface of elongate, closed path form having a stepped portion extending around the inner periphery of such footprint surface; and a gasket shaped to be received in said stepped portion and having a thickness to protrude below said footprint surface whereby to accommodate for disparity between the shape of said footprint surface and the roundness of a pipeline, said footprint surface being flat;

valve means being secured to said body within said recess, said body having a vent opening therein aligned with said valve means, and conduit means removably received in said vent opening to open said valve means and conduct away any escaping pipeline product, said recess defining spaced, parallel interior side wall portions in said body, said valve means including a valve block snugly received between said side wall portions and aligned thereby with said vent opening.

11. A device as defined in claim 10 wherein said valve means also includes a valve member slidable in said block and aligned with said vent opening, and spring means normally urging said valve member toward said vent opening.

12. Apparatus for repairing a defect in a pipeline without interrupting service through the pipeline, comprising in combination:
   a repair body having a bottom surface provided with a recess to define a footprint surface which surrounds the defect in the pipeline, said recess being stepped around the inner periphery of said footprint surface, and a resilient gasket disposed within the stepped portion of the recess;
   means for clamping said body temporarily against the pipeline so that said gasket sealingly engages between said body and the pipeline in circumscribing relation around the defect;
   said body having a vent opening leading to said recess and valve means within said recess and aligned with said vent opening normally to prevent communication between said recess and ambient atmosphere through said vent opening; and
   conduit means removably received in said vent opening for temporarily opening said valve means while said body is being welded to the pipeline, said valve means comprising a valve block secured to said body within said recess, a valve member slidable in said block and aligned with said vent opening, and spring means engaging between said valve block and said valve member normally urging said valve member toward said vent opening.

* * * * *